(12) United States Patent
Yokota (10) Patent No.: US 10,473,908 B2
(45) Date of Patent: Nov. 12, 2019

(54) OPTICAL OBSERVATION DEVICE

(71) Applicant: SHIMADZU CORPORATION, Kyoto-shi, Kyoto (JP)

(72) Inventor: Kazumi Yokota, Kyoto (JP)

(73) Assignee: SHIMADZU CORPORATION, Kyoto-shi, Kyoto (JP)

( * ) Notice: Subject to any disclaimer, the term of this patent is extended or adjusted under 35 U.S.C. 154(b) by 21 days.

(21) Appl. No.: 15/494,031

(22) Filed: Apr. 21, 2017

(65) Prior Publication Data

US 2018/0307027 A1 Oct. 25, 2018

(51) Int. Cl.
*G02B 21/36* (2006.01)
*G02B 21/26* (2006.01)
*G02B 21/06* (2006.01)
*G02B 21/08* (2006.01)

(52) U.S. Cl.
CPC .......... *G02B 21/367* (2013.01); *G02B 21/086* (2013.01)

(58) Field of Classification Search
CPC ................. G02B 21/08; G01Q 10/00
See application file for complete search history.

(56) References Cited

U.S. PATENT DOCUMENTS

| | | | | |
|---|---|---|---|---|
| 2006/0018013 A1* | 1/2006 | Suzuki | ............... | G01N 21/6452 359/368 |
| 2007/0058054 A1* | 3/2007 | Kagayama | ......... | G01N 21/6458 348/231.99 |
| 2010/0208052 A1* | 8/2010 | Sase | ..................... | G02B 21/365 348/79 |
| 2014/0353521 A1* | 12/2014 | Fujita | ................. | G01N 21/6458 250/458.1 |

FOREIGN PATENT DOCUMENTS

JP 11-95125 A 4/1999

* cited by examiner

*Primary Examiner* — Mainul Hasan
(74) *Attorney, Agent, or Firm* — Sughrue Mion, PLLC (57) ABSTRACT

An optical observation device having an imaging optical system for forming an image of light from an object on a sample stage, a movement information retaining unit for retaining the movement information on the sequence of the movement to each relative position and a plurality of relative positions of the sample stage to the imaging optical system, a moving unit for moving the sample stage and allowing the stage to rest at each relative position, an imaging data acquisition unit for continuously acquiring the imaging data of observation images obtained by the imaging optical system at a time interval shorter than the time to move the stage to each relative position and the time of rest at each resting position, and a discrimination information providing unit for providing to the imaging data discrimination information for distinguishing whether the imaging data is imaged at a timing when the stage is moving.

6 Claims, 5 Drawing Sheets

Light from LED light source 18

OPTICAL OBSERVATION DEVICE

TECHNICAL FIELD

The present invention relates to an optical observation device for forming an image of the light from an object to be observed to observe the object.

BACKGROUND ART

An optical microscope is a device that uses light such as reflected light, transmitted light, and fluorescence emitted from an object to be observed and an imaging optical system of an objective lens, an eye lens, and the like, to magnify images to observe the object. The range observable by an optical microscope at once (hereinafter will be referred to as "the observable range") is mainly determined by the magnification of the objective lens, wherein the observable range becomes small at the time of high magnification. For this reason, when an objective lens is set to high magnification, an observer may only be able to observe a portion of the range subjected to observation (hereinafter will be referred to as "a range for observation purpose").

On the other hand, Patent Literature 1 discloses a method of creating an overall image in the range for observation purpose by acquiring an observation image of an object to be observed for every observable range and connecting these observation images, when the observable range is smaller than the range for observation purpose. In this method, an object to be observed is placed on a movable stage, and an imaging optical system (objective lens) is set to low magnification to acquire an observation image in the range for observation purpose. And this observation image is divided into a plurality of small areas, an imaging optical system is changed into high magnification, the movement and stillness of the stage are repeated to arrange all small areas in sequence within the observable range of an imaging optical system, and the observation image of each small area is acquired. Then, the observation images of all small areas are connected to form an overall image of the range for observation purpose.

PRIOR ART LITERATURES

Patent Literatures (Patent Literature 1) Japanese Unexamined Patent Application Publication H11-095125

SUMMARY OF INVENTION

Problem to be Solved by the Invention

As observation images acquired by an optical microscope are becoming digitized in recent years, many controls and data processing therefore have been done using personal computers (PC) connected to an optical microscope. To create an overall image as mentioned above, first, a PC sends a movement control signal corresponding to a certain small area to an optical microscope. The optical microscope moves a stage to a predetermined position based on this movement control signal. And when the end of the movement of the stage is checked by a position sensor, or the like, a movement end signal is sent to the PC. Next, after the movement end signal is received, the PC sends an imaging control signal to the optical microscope. When the imaging control signal is received, the optical microscope captures the image within an observation visual field (observable range) and sends the imaging data to the PC. After the PC associates the imaging data acquired from the optical microscope with the position information on the small area and saves it, the PC sends the movement control signal corresponding to the next small area to the optical microscope. After these processing have been performed in all small areas, the PC synthesizes all the imaging data based on the above-mentioned position information.

With the above-mentioned method, the PC needs to confirm that the movement of a stage has ended for every small area. As the result of the accumulation of the times required for this confirmation, the time required to create an overall image becomes long. The higher the magnification at which one attempts to create an overall image, the higher the proportion of this confirmation time will be to account for all the exposure times.

The issue the present invention is to solve is to provide an optical observation device that can shorten the total capture time in an optical observation device that repeats capturing of observation images of an object to be observed at a plurality of positions.

Means for Solving the Problem

An optical observation device according to the present invention made in order to solve the problems described above is characterized by having
  a) an imaging optical system for forming an image of the light from an object to be observed placed on a sample stage,
  b) a movement information retaining means for retaining the movement information on the sequence of movement to each relative position and a plurality of relative positions of the sample stage to the imaging optical system,
  c) a moving means for moving the sample stage along said plurality of relative positions in accordance with the above-mentioned sequence and allowing the stage to rest at each relative position,
  d) an imaging data acquisition means for continuously acquiring the imaging data of the observation images obtained by the imaging optical system in a time interval shorter than any of the time to move to each relative position of the sample stage and the time of rest at each resting position, and
  e) a discrimination information providing means for providing to the imaging data the discrimination information used for distinguishing whether the imaging data is imaged at which timing, when the above-mentioned sample stage is moving or resting.

The "light" mentioned here may be any light with any wavelength, such as visible light, infrared light, ultraviolet light, and X-rays. "The light from an object to be observed" may be any kind of lights, such as transmitted light, reflected light, and fluorescence. "Resting" may be a state of movement at low speed to a degree that does not cause a blur to occur in the image captured by the imaging data acquisition means.

In the optical observation device according to the present invention, the movement information on the sequence of movement to each relative position and a plurality of relative positions of a sample stage to an imaging optical system is retained preliminarily in the movement information retaining means. A moving means moves a sample stage to each relative position or stays resting at each relative position based on this movement information. On the other hand, irrespective of whether the sample stage is moving or stays resting, an imaging data acquisition means continuously captures the observation images obtained by an imaging optical system in a time interval shorter than any of the time to move to each relative position of a sample stage and the time of resting at each resting position and acquires the imaging data. Thereby, the imaging data acquisition means not only captures observation images at the time of rest but also the observation images at the time of movement, and the optical observation device according to the present invention is further provided with a discrimination information providing means for providing to the imaging data the discrimination information for distinguishing the time of movement and the time of rest; therefore, a control/data processing device, such as a PC, connected to the optical observation device of the present invention can distinguish whether the imaging data belongs to the observation images at the time of rest or at the time of movement based on the discrimination information provided to the imaging data. In the optical observation device according to the present invention, the sequence of movement to each relative position and all relative positions is determined in advance, so a PC can know the relative position corresponding to [the movement] by extracting the imaging data at the time of rest in sequence. Therefore, the PC can create an overall image in the observation range based on the imaging data at the time of rest and the information on the relative position thereof. Since the PC does not need to confirm one by one that the movement of a sample stage has been completed as in the case in the above-mentioned prior art, it becomes possible to shorten the total exposure time.

For example, the imaging data at the time of movement is always contained between the imaging data (at the time of rest) at the first relative position and the imaging data (at the time of rest) at the second relative position. Therefore, a PC can distinguish the imaging data at the first relative position from the imaging data at the second relative position based on the imaging data at the time of movement being contained therebetween. The time interval of the imaging data acquired by the imaging data acquisition means is shorter than the time of rest at each resting position as mentioned above. Therefore, a plurality of imaging data at the time of rest at the same relative position may be acquired continuously. In such a case, the PC may be devised so as to extract only one [of the data]. When a plurality of the imaging data at the time of rest is obtained continually (namely, when the imaging data at the time of movement is not contained among [those data]), [the data] is the imaging data at the same relative position altogether from the above-mentioned reason.

When the optical observation device is provided with an illumination light source for illuminating an object to be observed, for example, the brightness information can be provided to the imaging data as the above-mentioned discrimination information by switching off the illumination light source at the time of movement and switching on the light at the time of rest. The PC can determine that, among a plurality of imaging data, the imaging data with low luminance uniformly as a whole belongs to the data at the time of movement.

An LED that can turn on/off the light at a high speed is desirable to be used as such illumination light source. The same effect can be acquired even if a shutter is provided between an illumination light source and an object to be observed or between an object to be observed and an imaging data acquisition means.

A light source may be provided at the focusing position and the conjugate position of an image-forming element for capturing observation images obtained by the imaging optical system, and the brightness information based on turning on/off the light of the light source may be provided to the imaging data as the discrimination information. The light from such a light source can be introduced into an image-forming element by distinguishing it from the observation image of an object to be observed by configuring so as to be introduced into an image-forming element, for example, via a half mirror.

The imaging time can also be given to the imaging data as the discrimination information. In this case, from the movement start time, the time to move a sample stage to each relative position, and the time of resting at each relative position, the PC computes the time zone when the sample stage is resting at each relative position and extracts in sequence each imaging data provided with the imaging time contained in that time zone.

A sample stage in the optical observation device according to the present invention may be moved horizontally or it may be moved in the height direction. When a sample stage is moved horizontally, the still picture at each relative position can be used for creating the overall image described above. When a sample stage is moved in the height direction, the still picture at each relative position can be used in order to match the focal point of an imaging optical system.

The focusing operation of a common imaging optical system is performed by moving a sample stage in the height direction and stopping the sample stage at the position where the imaging data is at its most focused. However, since a blur occurs in the image captured at the time of movement, in order to correctly determine from the imaging data whether the [image] is focused or not, it is desirable to allow the sample stage to stand still for every predetermined height to acquire the still picture in each height. The optical observation device according to the present invention can be used to acquire the still picture at each of this height.

Namely, a moving means repeats moving a sample stage to each relative position and resting the stage at each predetermined relative position (height) based on the movement information retained at the movement information retaining means. On the other hand, an imaging data acquisition means acquires the imaging data of an object to be observed on the sample stage irrespective of whether the sample stage is moving or resting. A discrimination information providing means provides to each imaging data the discrimination information for distinguishing the time of movement from the time of rest. A PC acquires the imaging data at the time of rest in the sequence of the movement to each relative position (height) based on the discrimination information. After the still image has been acquired at different heights in this manner, a contrast analysis is carried out on those images, and the focused image is determined. And the focal point of an imaging optical system is focused by sending a control signal to a device so as to move a sample stage to the height corresponding to the imaging data.

Effect of the Invention

In the optical observation device according to the present invention, the information on the movement of a sample stage at a plurality of relative positions and the sequence of movement to each relative position are retained in advance, the sample stage repeats the movement to each relative position and the resting at that relative position in this sequence, and the imaging data of the observation image at that relative position are continuously acquired at predetermined time intervals. Thereby, since it becomes unnecessary for a control/data processing device, such as a PC, or the like, connected to the optical observation device of the present invention to confirm the stillness of a sample stage one by one, the total exposure time can be shortened. Since the imaging data is provided with the discrimination information for distinguishing the time when a sample stage is moving and the time when it is resting in the optical observation device according to the present invention, the control/data processing device extracts from the obtained imaging data only the data at the time of resting, and an overall image in the range for observation purpose can be created based on the information on each relative position.

DETAILED DESCRIPTION OF EXEMPLARY EMBODIMENTS

The optical observation device according to the present invention will be described using FIG. 1 to FIG. 3 and the optical microscope of a visible light observation as an example.

Examples of Embodiment

Figure 1:
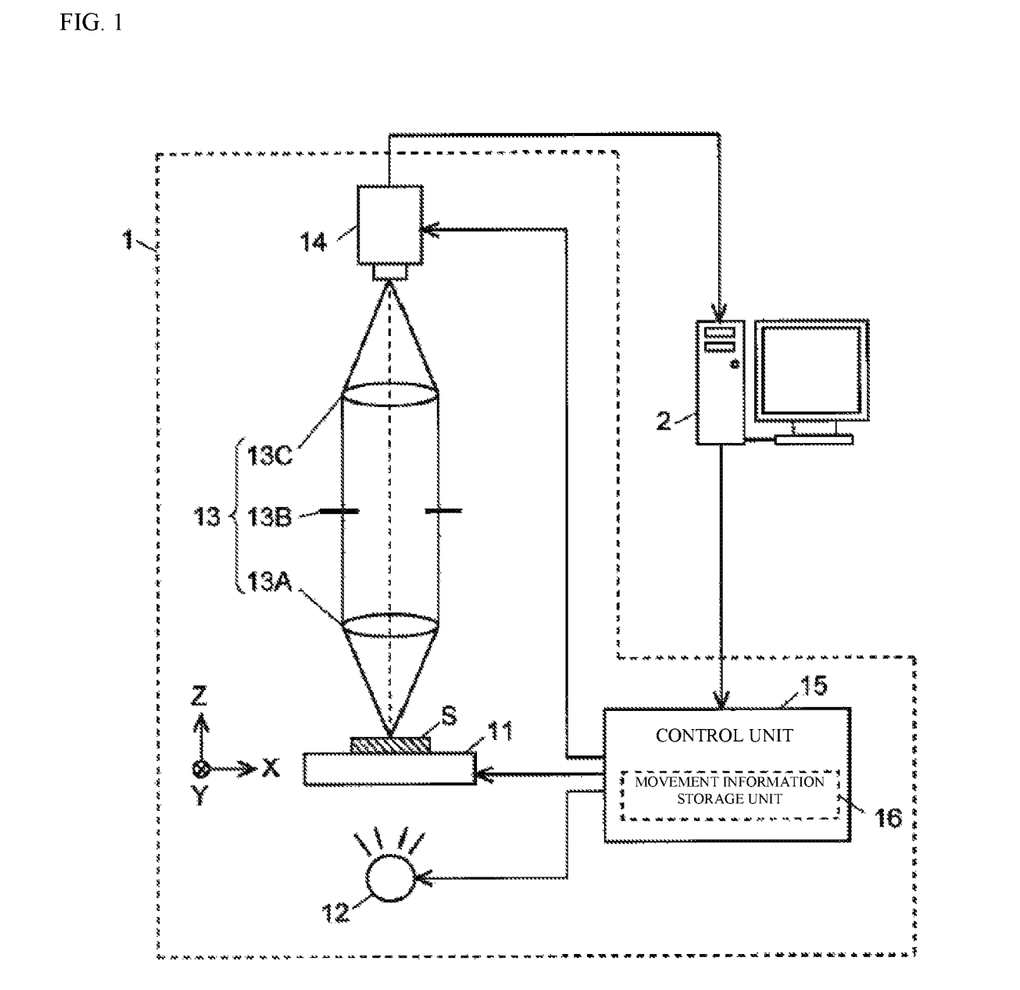
FIG. 1 is a schematic configuration diagram showing one example of embodiment of the optical observation device according to the present invention.
Figure 2:
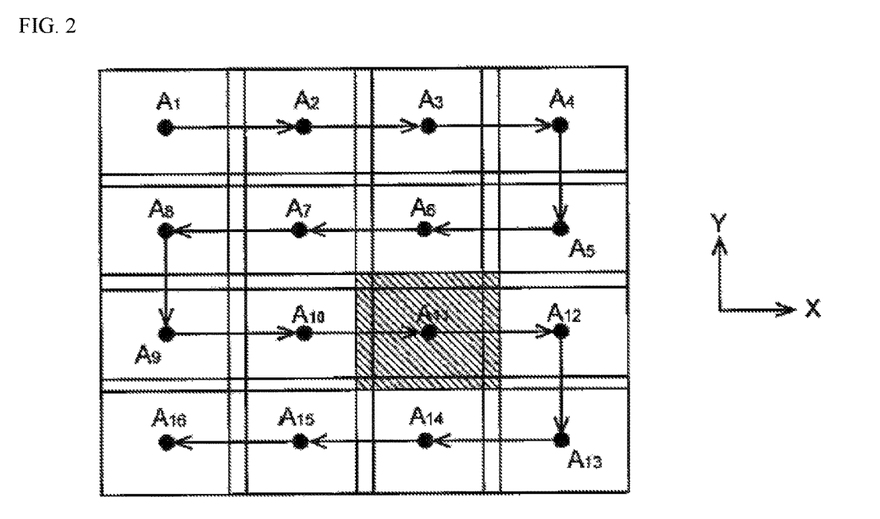
FIG. 2 is an explanatory view showing an example of the movement of the movable stage in the optical observation device of this example.

FIG. 1 is a schematic configuration diagram of an optical microscope 1 of this example of embodiment and a personal computer (PC) 2 for executing its control/data processing. This optical microscope 1 has a movable stage 11 on which an object to be observed S is placed, wherein this stage can be moved in the three axial directions XYZ; an illumination light source 12 for irradiating the illumination light to the object to be observed S; an objective lens 13A, an aperture 13B, and an eyepiece 13C serving as an imaging optical system 13; an observation image-imaging device 14 for capturing observation images of the object to be observed S whose image is formed by the imaging optical system 13; and a control unit 15 for controlling each of these parts in response to a control command from PC 2. The control unit 15 is equipped with a movement information storage unit 16 for storing the movement information sent out from PC 2.

The object to be observed S is placed in the middle of the movable stage 11. Movement to the Z-axis (direction vertical to the mounting surface of the movable stage 11) of the movable stage 11 is used for carrying out a focusing operation, and the change of the observation position of the object to be observed S is made using two axes: the X-axis and Y-axis (direction parallel to the mounting surface of the movable stage 11).

The illumination light source 12 is provided below the movable stage 11 to observe the object to be observed S by the transmitted light. Those capable of turning on/off light at a high speed such as LED are used as this illumination light source 12.

The observation image-imaging device 14 is a CCD camera or a CMOS camera, connected to the PC 2 through an interface of USB, IEEE1394, Ethernet (registered trademark), or the like, captures an image of the observation images whose images are formed by the imaging optical system 13 at predetermined imaging time intervals (frame rate), and transmits the imaging data of each time to the PC 2. This imaging time interval is set up to be shorter than any of the time required to move the movable stage 11 to each relative position and the time of resting at each relative position.

Hereinafter, the method of creating an observation image in a predetermined range for observation purpose in the object to be observed S with high magnification by an optical microscope 1 of this example of embodiment and PC 2 will be described. Here, the observation image data at a low magnification in the range for observation purpose is to be preliminarily acquired using an objective lens 13A of low magnification.

A user specifies the magnification of the objective lens 13A used for high-magnification observation in the range for observation purpose. Then, the PC 2 obtains the size of the observable range in the observation image based on the specified magnification and the magnification of the objective lens 13A used when the observation image of low magnification is acquired. And an overall image is divided into a plurality of small areas based on this observable range, and the center position of each small area and the sequence of movements to each center position are determined. FIG. 2 is an example of a plurality of small areas set up in the range for observation purpose and the center position (A1-A16 in the drawing) of each small area. These small areas overlap with a portion of the adjacent area for the adjustment at the time of connecting images.

Then, each center position is made to correspond to each relative position of the movable stage 11, and the information on the sequence of movements and each relative position serve as the movement information and are sent out to the control unit 15 along with the control commands.

The control unit 15 stores the movement information in the movement information storage unit 16, starts the imaging at the observation image-imaging device 14, and moves the movable stage 11 to the first relative position in the movement information. And the movable stage 11 is allowed to rest at the first relative position, the information on a relative position is sequentially read from the movement information stored in the movement information storage unit 16, and the movement of the movable stage 11 to each relative position and the resting of the movable stage 11 at each relative position are controlled. According to the control of the movable stage 11, the operation of turning on/off the illumination light source 12 is controlled.

Figure 3:
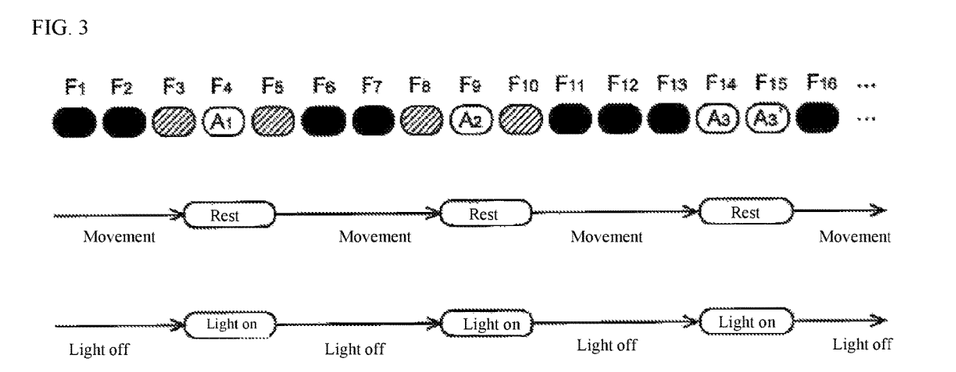
FIG. 3 is a state transition diagram showing the relation of the luminance state of an observation image, the state of the movable stage, and the state of an illumination light source.

FIG. 3 shows a transition of the state of the movement and resting of the movable stage 11, the photographing timing of the observation image-imaging device 14, and the state of turning on/off the illumination light source 12. The control unit 15 controls the operation of turning on/off the illumination light source 12 according to the control of the movable stage 11 so as to turn off the illumination light source 12 when the movable stage 11 is moved and to turn on the illumination light source 12 when the movable stage 11 is resting as shown in FIG. 3.

By this series of controls, the imaging data at the time the movable stage 11 is moved (for example, $F_1$, $F_2$, etc.) becomes dark, and the imaging data at the time the movable stage 11 is resting (for example, $F_4$, $F_9$, etc.) becomes bright.

From the imaging data obtained from the observation image-imaging device 14, the PC 2 can extract the imaging data when the movable stage 11 is resting by deleting the imaging data with low luminance. Since the imaging time interval of the observation image-imaging device 14 is set up to be shorter than any of the time required for the movable stage 11 to move to each relative position and the time for it to rest at each relative position, the imaging data at the time of movement is always contained between the imaging data An at the $n^{th}$ relative position and the imaging data An+1 at the $(n+1)^{th}$ relative position. Therefore, the PC 2 can distinguish the imaging data An at the $n^{th}$ relative position from the imaging data An+1 at the $(n+1)^{th}$ relative position based on the fact that the imaging data at the time of movement is contained in between. When the imaging data with high luminance is acquired continuously (for example, $F_3$, $F_4$, and $F_5$), since it is the imaging data at the same relative position for all based on the reason described above, only one is acquired by adopting the imaging data with the highest luminance (for example, $F_4$). The comparison of the luminance for every imaging data can be obtained by the total or average of the luminance of each pixel that constitutes an image, for example.

Since PC 2 has sent out the movement information to the movable stage 11 from itself, it can match the small area in the range for observation purpose corresponding to the imaging data at the time of each resting. For example, when the PC 2 sends out the movement information so as to move the movable stage 11 in sequence from $A_1$ to $A_{16}$ as in the case shown in FIG. 2, the imaging data at the time of each resting is pasted to the small area corresponding to from $A_1$ to $A_{16}$ in the order at which it was extracted, and the deletion of overlapping parts and the luminance of each imaging data can be adjusted, thereby making it possible to create an overall image.

The time of rest of the movable stage 11 is determined by the frame rate of the observation image-imaging device 14. For example, if the time required for forming images of two frames is set to the time of resting, a suitable image that received the light from the illumination light source 12 can be sufficiently obtained for at least one frame under any circumstances. In a special case, a suitable image for both two frames can be obtained (for example, $F_{14}$ ($A_3$) in FIG. 2) and $F_{15}$ ($A_3$'); however, in that case, only an image (for example, $F_{14}$ ($A_3$)) of one frame is selected.

By the series of the above controls, it becomes possible to provide the discrimination information for distinguishing the state of movement and resting of the movable stage 11 to the imaging data of the observation image-imaging device 14. Therefore, the PC 2 can simply sequentially extract those in a resting state from the imaging data outputted continuously and acquire a suitable still picture in a minimum amount of time.

Figure 4:
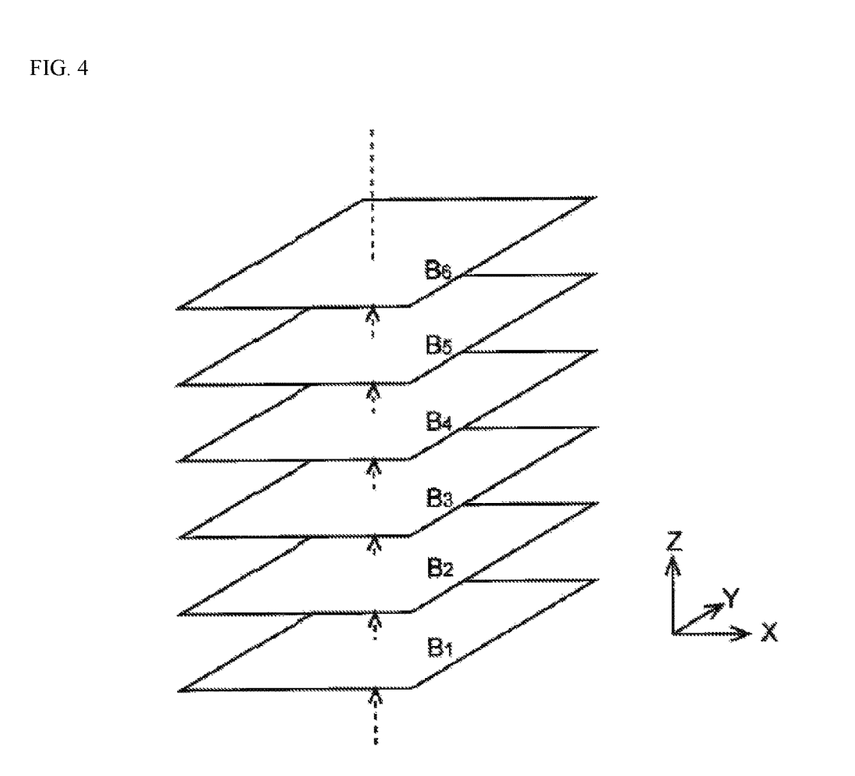
FIG. 4 is an explanatory view showing another example of the movement of the movable stage in the optical observation device of this example.
Figure 5:
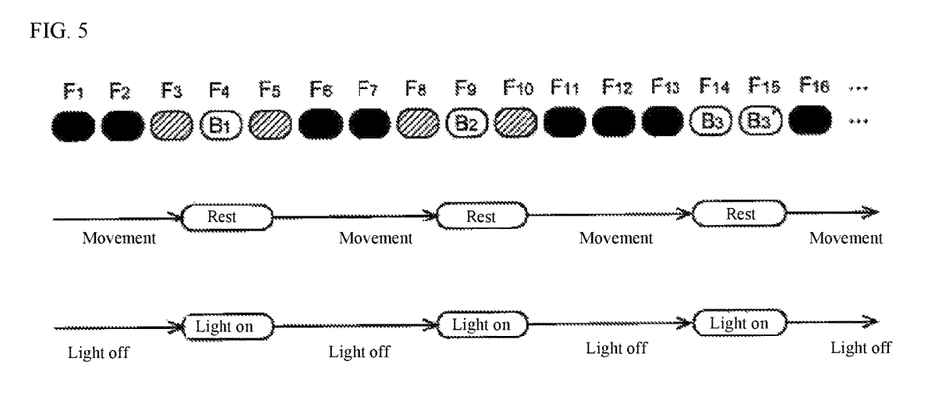
FIG. 5 is a state transition diagram showing the relation of the luminance state of an observation image, the state of a movable stage, and the state of an illumination light source.

Next, FIG. 4 and FIG. 5 show examples where the optical microscope 1 of this example of embodiment was applied to an automatic focus operation. The device configuration is the same as the configuration shown in FIG. 1.

In an automatic focus operation, the movable stage 11 is moved to Z axial direction (for example, from bottom to top) and allowed to stand still in sequence at each relative position (B1-B6 in the drawing) (FIG. 4). With the exception of changing the moving direction from the XY axial direction to the Z axial direction, [this operation] is carried out by completely the same as the method shown in the above-mentioned example of embodiment. Since the control of the movable stage 11 and the illumination light source 12 shown in FIG. 5 can be applied as well similarly to the case shown in FIG. 3, the imaging data when the movable stage 11 is resting in the Z axial direction can be extracted by the same method as described above.

Also in this example of application, since the PC 2 sends the movement information to the movable stage 11, the PC 2 can grasp the positions ($B_1$-$B_6$ in the drawing) of the Z-axis corresponding to the imaging data at the time of each resting. Next, a contrast analysis is performed to the imaging data at the time of each resting obtained to determine the imaging data at the time of resting where the contrast is at the sharpest so the fact that [the image] is in a focused state can be determined. The position of the movable stage 11 can be aligned to the focal position of the imaging optical system 13 by moving the movable stage 11 to the position on the Z-axis corresponding to that imaging data. Also in this case, the time required from the start until the end of moving the movable stage 11 can be kept to a minimum.

The above-mentioned example of embodiment has been described using a transmitted light; however, it is clear that using a reflected light can also realize the same configuration.

Figure 6:
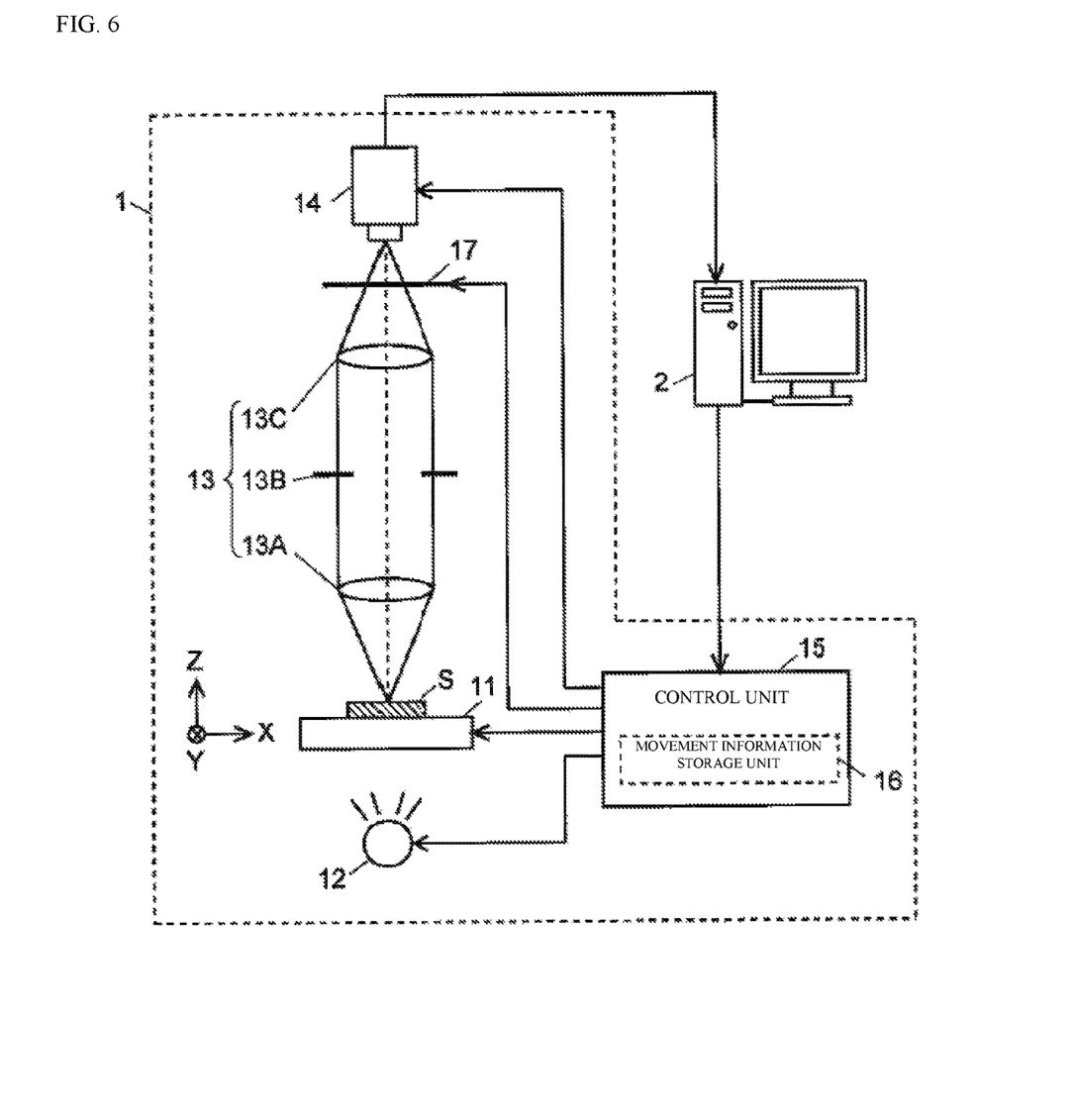
FIG. 6 is a schematic configuration diagram showing a modified example of the optical observation device of this example of embodiment.

In the above-mentioned example of embodiment, the change in the brightness information by turning on/off the illumination light source 12 was used as the discrimination information provided to imaging data; however, the same can also be realized by providing a shutter 17 that can electrically control the opening and closing between the illumination light source 12 and the observation image-imaging device 14, as shown in FIG. 6. A liquid crystal shutter using a cross nicol, a mechanical shutter having an electric drive control, and the like, can be exemplified as a shutter that can electrically control an optical opening and closing.

Figure 7:
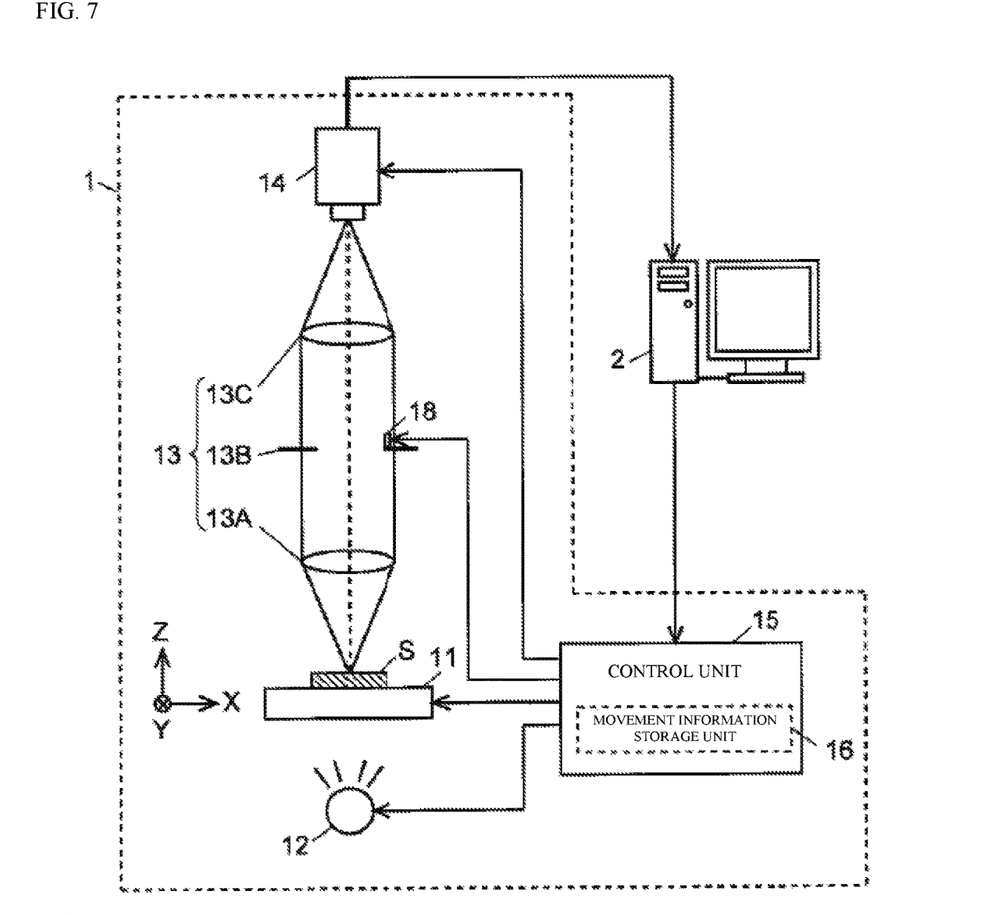
FIG. 7 is a schematic configuration diagram showing another modified example of the optical observation device of this example of embodiment.

As shown in FIG. 7, the discrimination information can also be provided to the imaging data by providing an LED source 18 on the frame on an eyepiece 13C side of the aperture 13B, interlocking its light on/off with the control of the movable stage 11.

Figure 8:
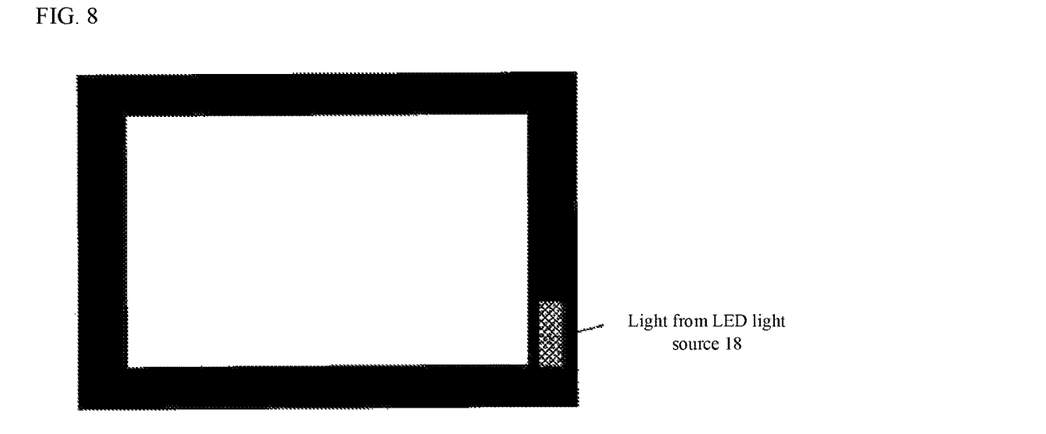
FIG. 8 is an explanatory view showing an example of the observation image acquired by the optical observation device of a modified example.

The example of the image formed by this method is shown in FIG. 8. The rectangular area in the middle is an area where an observation image is displayed. The black portion surrounding it is equivalent to the frame of the aperture 13B. The portion corresponding to the frame of the aperture 13B is displayed in black when the LED source 18 is not on, and as shown in FIG. 8, the portion corresponding to the LED source 18 is illuminated when the LED source 18 is turned on. Therefore, similarly to the case in the example of embodiment described above, for example, if the LED source 18 is made to turn on when the movable stage 11 is resting, the extraction process of the imaging data at the time of rest can be carried out simply by checking whether the light is on or off at the predetermined position of the frame.

The data of the imaging time can also be provided to the imaging data as the discrimination information. The movement distance to each relative position of the movable stage 11 can be calculated in advance, so as long as the PC 2 acquires the movement speed of the movable stage 11 in advance, it is possible to calculate the arrival time to each relative position from those information and the movement start time (imaging start time). The PC 2 can simply extract the imaging data of the imaging time corresponding to (or those nearest) the arrival time to each relative position as the imaging data at the time of rest.

The above configuration can also be applied to a microspectroscopic system. In this case, since it becomes possible to acquire a mapping image that connects a micro image serving as a wide-area image in a short time by the method shown in the above-mentioned example of embodiment, the positioning time at a spectrometry point can be shortened. Furthermore, it becomes possible to acquire the mapping image according to the wavelength zone included in the illumination light in a short time by using a spectroscopic monochromatic light or an infrared interference light generated by an interferometer by an infrared microscope as the illumination light.

EXPLANATIONS OF REFERENCES

1 . . . Optical microscope
11 . . . Movable stage
12 . . . Illumination light source
13 . . . Imaging optical system
13A . . . Objective lens
13B . . . Aperture
13C . . . Eyepiece
14 . . . Observation image-imaging device
15 . . . Control unit
16 . . . Movement information storage unit
17 . . . Shutter
18 . . . LED source
2 . . . PC
S . . . Object to be observed

What is claimed:

1. An optical observation device, comprising:
an imaging optical system comprising at least one from among an eyepiece, aperture, and lens, the imaging optical system configured to form an image of light from an object to be observed placed on a sample stage,
the sample stage, wherein the sample stage is configured to move to a plurality of relative positions in accordance with a sequence and rest at each relative position;
memory configured to retain movement information on the sequence and the plurality of relative positions of the sample stage with respect to the imaging optical system;
a camera configured to continuously acquire imaging data of observation images obtained by the imaging optical system, the imaging data being acquired continuously at a time interval shorter than a time to move the sample stage to each of the relative positions and shorter than a time of rest at each of the relative positions, such that the imaging data is acquired when the sample stage is resting at each of the relative positions and when the sample stage moves between each of the relative positions,
at least one processor configured to receive discrimination information, provided with the imaging data, for distinguishing whether the above-mentioned imaging data is imaged at a time when the sample stage is moving; and
an illumination light source configured to illuminate the object to be observed, wherein the illumination light source is configured to turn off when the sample stage is moving and turn on when the sample stage is resting, such that the at least one processor receives, via the camera, brightness information as the discrimination information,
wherein the sample stage is configured to move in a direction vertical to a surface on which an object to be observed is mounted on the sample stage.

2. The optical observation device as recited in claim 1, further comprising:
an illumination light source configured to illuminate the object to be observed, and
a shutter provided between the illumination light source and the camera, wherein the shutter is configured to shut off when the sample stage is moving and open when the sample stage is resting, such that the at least processor receives, via the camera, brightness information as the discrimination information.

3. The optical observation device as recited in claim 1, wherein
the imaging optical system comprises the aperture, and the aperture is configured to capture observation images obtained by the imaging optical system; and
the optical observation device further comprises a light source provided at a side of the aperture, the light source configured to turn on and off such that the at least processor receives, via the camera, brightness information as the discrimination information.

4. An optical observation method, comprising:
forming an image of the light from an object to be observed placed on a sample stage by an imaging optical system that comprises at least one from among an eyepiece, aperture, and lens,
moving the sample stage to a plurality of relative positions in accordance with a sequence and allowing the sample stage to rest at each relative position;
retaining movement information on the sequence and the plurality of relative positions of the sample stage with respect to the imaging optical system;
continuously acquiring imaging data of observation images obtained by the imaging optical system, the imaging data being acquired continuously at a time interval shorter than a time to move the sample stage to each of the relative positions and shorter than a time of rest at each of the relative positions, such that the imaging data is acquired when the sample stage is resting at each of the relative positions and when the sample stage moves between each of the relative positions,
providing, to the imaging data, discrimination information for distinguishing whether the above-mentioned imaging data is imaged at a time when the sample stage is moving, and
illuminating the object to be observed by an illumination light source, wherein brightness information is provided to the imaging data by turning off the illumination light source when the sample stage is moving and by turning on the light source when the sample stage is resting, wherein the sample stage is moved in a direction vertical to a surface on which an object to be observed is mounted on the sample stage.

5. The optical observation device as recited in claim 4, wherein the object to be observed is illuminated by an illumination light source, and
   a shutter is provided between the illumination light source and a camera that acquires the imaging data, wherein the brightness information is provided to the imaging data by shutting off the shutter when the sample stage is moving and by opening the shutter when the sample stage is resting.

6. The optical observation device as recited in claim 4, further comprising capturing observation images obtained by the imaging optical system;
   wherein a light source provided at a side of the aperture of the imaging optical system, wherein the discrimination information is provided by turning on/off the light source.

\* \* \* \* \*